Oct. 31, 1939.  E. M. ZIER  2,178,059
MELTING FURNACE
Filed April 13, 1936   2 Sheets-Sheet 1
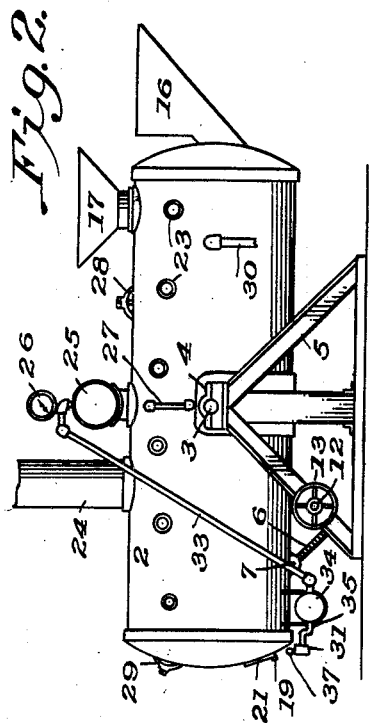
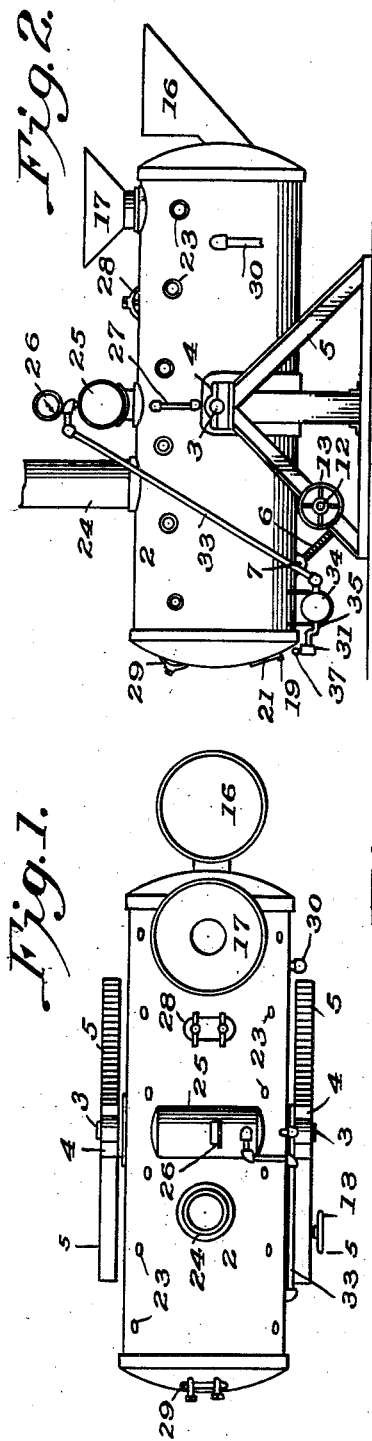
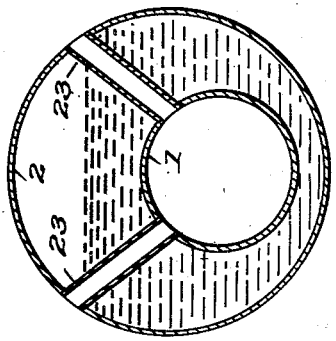
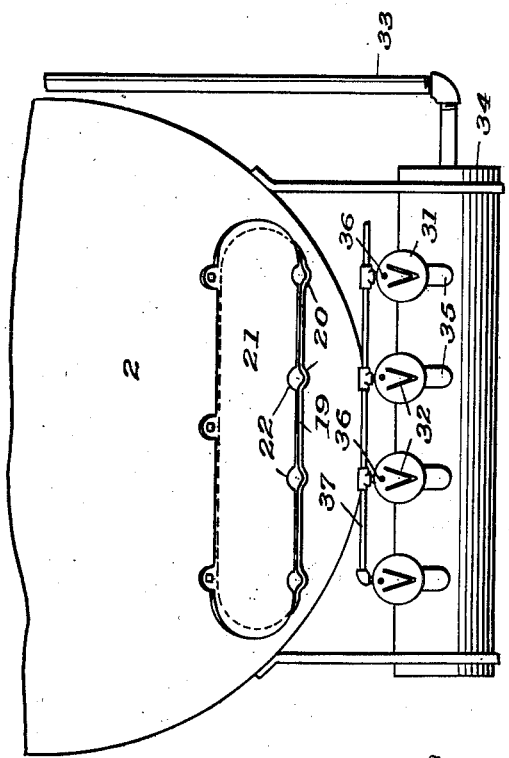
Inventor
EDWARD M. ZIER
By  Milans & Milans
Attorneys Oct. 31, 1939.  E. M. ZIER  2,178,059
MELTING FURNACE
Filed April 13, 1936  2 Sheets—Sheet 2
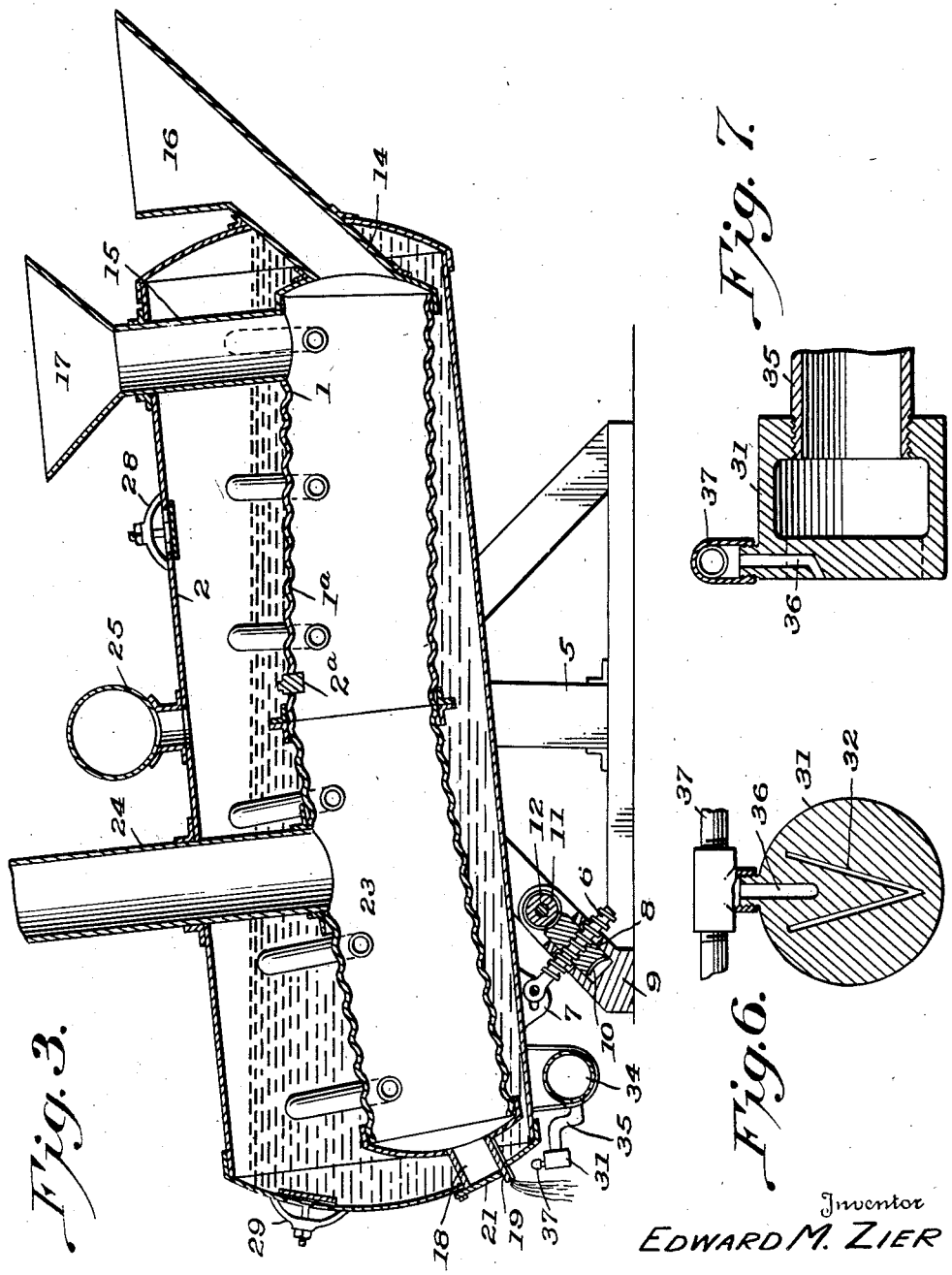
Inventor
EDWARD M. ZIER
By Milans & Milans
Attorneys

Patented Oct. 31, 1939

2,178,059

UNITED STATES PATENT OFFICE 2,178,059

MELTING FURNACE

Edward M. Zier, New Albany, Ind., assignor to Rozine B. Zier, New Albany, Ind.

Application April 13, 1936, Serial No. 74,158

2 Claims. (Cl. 49—53)

This invention relates to improvements in melting furnaces for melting mineral products such as glass, rock dirt, shale, iron, steel, etc., and adapted to be used for the manufacturing of glass, rock and mineral wools and other materials to be melted to a flowing stage, for casting, blowing or spinning.

An object of the invention is to provide an improved melting furnace provided with an outer casing spaced from the walls of the melting chamber and forming a steam generating chamber and means for protecting the walls of the melting chamber, the construction providing for submerging the inner chamber in water, and the heat that is introduced directly into the inner chamber for melting the raw material also generating steam in the outer chamber for use in the treatment of the molten material.

Another object of the invention is to provide an improved furnace of the character referred to adapted to be tilted to control the flow of melted material through the same, and which will be of compact form while affording the necessary space for steam in the outer chamber, and will also provide for maintaining the inner chamber completely submerged when the furnace is tilted.

A further object of the invention is to provide an improved arrangement of fuel intakes for the melting chamber that will provide for adjusting the temperatures as the material flows towards the discharge end of the melting chamber and for having material flowing at the proper heat.

A still further object of the invention is to provide an improved method and means for applying oil to the molten material.

The invention, with other objects and advantages thereof, and the particular construction, combination and arrangement of parts comprising the same, will be understood from the hereinafter contained detailed description, when considered in connection with the accompanying drawings, forming part hereof and illustrating one embodiment of the invention.

In the drawings:

Figure 1 is a top plan view of a furnace constructed in accordance with the present invention.

Fig. 2 is a side elevation.

Fig. 3 is a vertical longitudinal section, on an enlarged scale, the furnace being shown adjusted to extend at a downward inclination from rear to front.

Fig. 4 is a fragmentary view, on an enlarged scale, of the outlet end of the furnace.

Fig. 5 is a transverse section on the line 5—5 of Figure 1, and

Figs. 6 and 7 are detail views of one of the blower nozzles.

While a preferred embodiment of the invention is illustrated in the drawings, it will of course be understood that changes and modifications may be made in the particular construction shown and the invention may be embodied in other forms as will appear to those skilled in the art and falling within the scope of the appended claims, without departing from the spirit of the invention.

Referring to a detailed description of the particular embodiment of the invention illustrated in the drawings, the construction shown comprises an inner casing 1 of general cylindrical form and a cylindrical outer casing 2 suitably secured together in spaced relation as shown. The inner casing constitutes the fire box and melting chamber. The outer casing forms with the inner casing an outer steam generating chamber, the relative size and arrangement of the casings being such that the outer chamber is adapted to receive sufficient water to submerge the inner casing to protect the same and also to afford the desired space for steam. As shown in Figure 3 of the drawings, the inner casing, which is provided with circumferential corrugations 1a, slopes downwardly in opposite directions from a point intermediate its ends toward opposite ends of the outer casing, the pitch of the oppositely disposed inclined sections of the casing being such so that when the furnace is tilted longitudinally to the extreme requirements, the casing will still be submerged and protected by the water in the outer chamber, this arrangement providing a compact construction that affords the proper steam space and for the inside casing to be submerged and protected by water at all times.

In the wall of the inner casing is a fusible plug 2a located about midway of the ends of the casing near the extreme topmost point thereof, so that when the furnace is tilted the water stays at about the same distance above the plug, the water above the casing being always shallowest at this point.

The inner wall of the melting chamber may, if desired, be provided with a lining of refractory material. This is not necessary when melting materials that are high in silica as the silica chills when it comes in contact with the metal wall of the inner casing backed up by water and the inner surfaces of the walls of the melting chamber become lined during use with a layer of chilled slag.

The furnace is supported to provide for tilting the same longitudinally. Suitably secured to the outer casing 2 are trunnions 3, which are mounted in bearings 4 on pairs of supports or frames 5. Mechanism of any suitable character is provided for tilting the furnace and holding the same in different positions of angular adjustment. The means for this purpose shown in the present instance comprises a threaded rod 6 pivotally connected at one end to a lug 7 on the outer casing 2 and engaging a nut 8 that is mounted for rotation in a support 9 and provided with gear teeth 10 to engage a worm 11 fixed on a shaft 12. On the outer end of the shaft is a hand wheel 13 for turning the same. As will be understood, by rotating the shaft the furnace can be tilted to any desired angle.

The melting chamber is provided at its rear end with inlets 14—15 for raw material, said inlets extending through the outer chamber and the wall of the outer casing. Means is provided for continuously feeding the raw material to the melting chamber. Any suitable feeding means may be employed, that shown in the drawings by way of example, comprising hoppers 16—17 having spouts connected with the inlets.

At its forward end the melting chamber has an outlet 18. The lower wall 19 of the outlet extends a short distance beyond the wall of the outer casing, as shown, and is provided at intervals with set ins or depressions 20 for directing the discharge of the molten material in a plurality of streams to be acted on by fluid jets to separate the material into fibrous structure. 21 designates a removable closure plate for the outlet 18, said plate being provided in its lower portion with openings 22 arranged to be disposed opposite the stream directing depressions 20.

A series of fuel intakes 23 are provided at each side of the melting chamber, said intakes being arranged at intervals along the furnace and extending downwardly at an inclination through the walls of the outer casing to the upper part of the melting chamber, the construction providing for operating the furnace with gas, oil or pulverized coal, and for adjusting the temperatures as the material flows toward the discharge end of the melting chamber. 24 designates a stack for carrying off the combustion gases from the melting chamber.

On the outer casing 1 is a steam dome 25 and steam and water gauges 26—27. 28 and 29 designate manholes. The outer casing is also provided with a suitable flexible pipe connection for supplying water to the outer chamber, such a pipe connection being indicated in a general way and designated 30.

Located near the stream directing depressions 20 in the bottom wall of the outlet 18 are a series of blowers 31 for directing jets of steam against the stream of molten metal to separate the same into a fibrous mass. A suitable blower chamber, not shown, is provided to receive the separated material from the jets. Each of the blowers is shown as comprising a nozzle of cylindrical form provided with a discharge outlet 32.

Steam is supplied to the nozzles from the steam generating chamber of the furnace. A conduit 33 leads from the steam dome 25 to a manifold 34 to which the nozzles are connected by pipe 35.

The invention provides an improved method for mixing oil with the material so that there will be a small percentage of oil in the finished product to keep down dust and make it softer to handle. In accordance with the invention, as the material is separated into fibers by the jet of steam, oil in a finely divided condition is mixed therewith. To carry out the method, means is provided for feeding oil to the nozzles. In the present instance, each of the nozzles is shown provided with a passage 36 leading from the upper side thereof to its front face, the passage being connected by a conduit 37 with a suitable oil supply, not shown. The discharge openings 32 of the nozzles have spaced branches connected at their lower ends, and the outlet of the passage 36 is located between the spaced branches of the nozzle openings, the latter being preferably of V-shape form, as shown. The jets pull the oil off of the nozzles in the form of a mist and carry the same to the material, the resulting product being uniformly oiled. The arrangement described also has the advantage that the oil fed to the nozzle runs on the front face thereof and acts to keep the molten slag from cutting or wearing out the same.

The particular combination and arrangement of parts hereinbefore described affords a furnace that is well adapted for the purposes set forth. It provides for carrying on the melting process and the manufacture of rock and mineral wools continuously and economically.

Provision is made for readily controlling the flow of molten material and for adjusting the temperatures to which the material is brought. The structure is of a compact nature and the provision of the outer chamber in conjunction with the melting chamber, provides for utilizing the heat that is introduced directly into the melting chamber for melting the raw material, to also generate steam for use in the treatment of the molten material, the chamber also affording means for protecting the wall of the melting chamber. The improved method for applying oil to the material results in a superior product and the means for carrying out the method is of a simple, efficient nature.

What I claim is:

1. A furnace including an inner casing constituting a melting chamber, an outer casing spaced from the walls of the inner casing providing an outer steam generating chamber, said outer chamber being adapted to receive water to submerge the inner casing to protect the same, the melting chamber having an inlet and an outlet at opposite ends thereof extending through the wall of the outer casing, means for introducing fuel into the melting chamber, the furnace being pivotally supported to be tilted longitudinally, and the inner casing being of a form to remain submerged when the furnace is tilted to a substantial degree, said inner casing having a rear section extending at a downward inclination toward the rear end of the outer casing.

2. A furnace including an inner casing constituting a melting chamber, an outer casing spaced from the walls of the inner chamber providing an outer steam generating chamber, said outer chamber being adapted to receive water to submerge the inner chamber to protect the same, the melting chamber having an inlet and an outlet at opposite ends extending through the wall of the outer casing, means for introducing fuel into the melting chamber, said outer casing being pivotally supported to be tilted longitudinally, and the inner casing being of a form to remain submerged when the furnace is tilted to a substantial degree, said inner casing from a part intermediate the ends thereof being oppositely inclined downwardly towards opposite ends of the outer casing.

EDWARD M. ZIER.